July 26, 1966  L. M. CASTLE  3,262,129
SEALING DEVICE FOR A SAFETY SUIT
Filed July 14, 1964

INVENTOR.
LILLIAN M. CASTLE
BY
Brown, Critchlow, Flick & Peckham
ATTORNEYS.

United States Patent Office 3,262,129
Patented July 26, 1966

3,262,129
SEALING DEVICE FOR A SAFETY SUIT
Lillian M. Castle, Pittsburgh, Pa., assignor to Mine Safety Appliance Company, Pittsburgh, Pa., a corporation of Pennsylvania
Filed July 14, 1964, Ser. No. 382,447
2 Claims. (Cl. 2—270)

This invention relates to devices for providing seals around encircled objects, and more particularly to a device for sealing the extremities of a safety suit.

Safety suits that protect the clothing and body from dangerous chemicals or gases are used in many industries. To obtain full protection, the extremities of such suits, such as the collars and the sleeves and pant legs, should be drawn in close to the body so that the suits will be sealed.

It is among the objects of this invention to provide a sealing device that can be used with safety suits, which is simple and inexpensive in construction, which can be quickly closed and opened, and which requires no ties or fastening members to hold it in sealing position.

In accordance with this invention a ring is provided with an outwardly opening channel around it, and spaced axially from this ring is an elastic ring which is at least as small as the first ring. A flexible sleeve between the rings has its ends attached to them. When either ring is turned on its axis relative to the other, the sleeve will be twisted to reduce the diameter of its central portion and to draw the rings toward each other. The elastic ring then is expanded manually to permit it to be slipped over the other ring and into the channel therein, whereby to hold the two rings together and prevent them from rotating relative to each other. The entire sealing device may encircle the wrist portion of a sleeve of a safety suit for example, or the channeled ring may be secured to the end of the sleeve. When the other ring is rotated to twist the sleeve of the sealing device, the safety suit will be sealed around the wrist.

Figure 1:
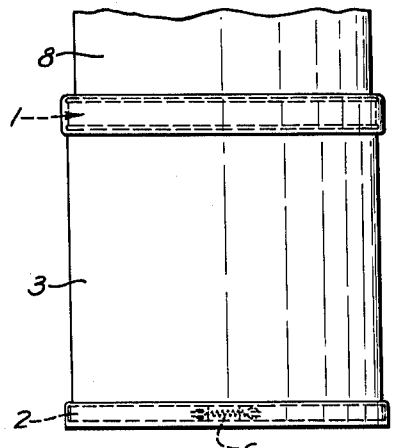
Figure 2:
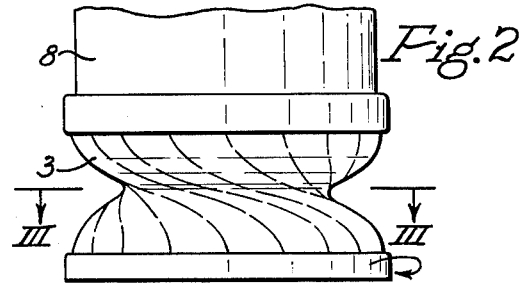
Figure 3:
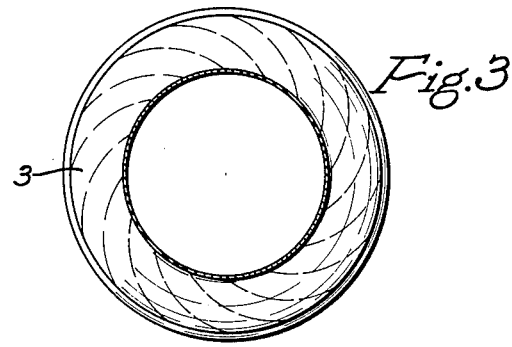
Figure 4:
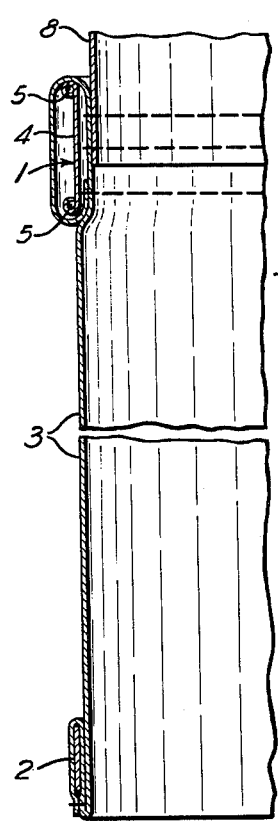
Figure 5:
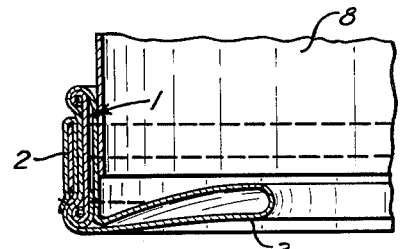
Figure 6:
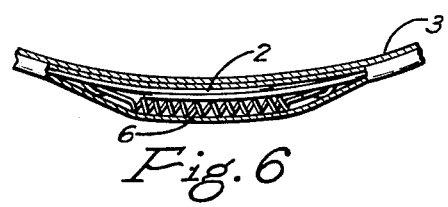

The preferred embodiment of the invention is illustrated in the accompanying drawings, in which:

FIG. 1 is a side view of my sealing device secured to a sleeve of a safety suit;
FIG. 2 is a similar view, but showing the device being twisted;
FIG. 3 is a cross section taken on the line III—III of FIG. 2;
FIG. 4 is an enlarged, fragmentary longitudinal section of the safety device and suit sleeve;
FIG. 5 is a similar view, but showing the rings nested together; and
FIG. 6 is an enlarged, fragmentary transverse section of the elastic ring.

Referring to the drawings, my sealing device is formed from three principal parts; two axially spaced rings 1 and 2 and a flexible sleeve 3 connecting them. One of the rings is formed with an outwardly opening shallow channel 4 extending around it. This can be done conveniently by making the ring from substantially flat material, such as a metal strip, and turning its edges outwardly to form beads 5. The other ring 2 can be made of elastic material or it can be made elastic by splitting a metal ring transversely, overlapping its ends and fastening a coil spring 6 to the outside of the ring at points near the overlapping end portions. The spring holds the ends in overlapping relation but permits the ring to be expanded when desired. In its unexpanded state, this ring is at least as small as the other ring and it is narrow enough to fit in channel 4 thereof.

The flexible sleeve 3, by which the two spaced rings are connected, is made of any suitable material, such as cloth or rubber. The connection of the ends of the sleeve to the rings may be made in various ways. They can be glued to the rings or riveted to them, but preferably they are simply wrapped around each ring and stitched in place as shown in FIG. 4. As will be understood presently, it is best that the sleeve extend through the split ring 2 and be joined to it at the edge of that ring that is farthest from the other ring.

This sealing device may be secured to the end of a sleeve 8 of a safety suit as shown in FIG. 1. After the hand and arm have been inserted in the garment sleeve, the elastic ring 2 is turned on its axis as indicated in FIG. 2, which twists the sealing sleeve 3. As this sleeve is twisted, it will contract and the diameter of its central portion will be reduced as shown in FIG. 3 until it tightly engages the wrist. Also, as the sealing sleeve is twisted, its length is reduced, so that the elastic ring is drawn toward the other one. When the twisting has been completed, the elastic ring is expanded manually sufficiently to permit it to be slipped over the other ring and into its channel 4 to hold the two rings together as shown in FIG. 5. The friction between them will prevent them from rotating relative to each other and allowing the sleeve to untwist. Due to sleeve 3 having been extended through the elastic ring, when that ring is slipped over the other one none of the body of the sleeve will be caught between the two rings.

It will be seen that with this invention the sealing device is very simple and can be held in operative position by the two rings themselves, without any other fastening members.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. A sealing device for a safety suit, comprising a ring formed of substantially flat material and having outturned edges to form a channel around it, a transversely split ring formed from substantially flat material normally spaced axially from the other ring and having overlapping end portions, a tension spring having ends connected to the outside of the split ring at points near said overlapping portions, the spring normally holding the split ring contracted to a size at least as small as the other ring, the split ring being narrow enough to fit in said channel, and a flexible sleeve having one end attached to the channel ring and having its opposite end extending through the split ring and attached to the edge thereof farthest from the channel ring, whereby when either ring is turned on its axis relative to the other the sleeve will be twisted to reduce the diameter of its central portion and draw the rings toward each other, the spring permitting the split ring to be expanded enough to be slipped over the other ring and into said channel to hold the rings together.

2. A sealing device for a safety suit, comprising a ring provided with an outwardly opening channel around it, an elastic ring normally spaced axially from the other ring and at least as small as that ring normally, the elastic ring being narrow enough to fit in said channel, and a flexible sleeve having one end wrapped around said channel ring and secured thereto, the opposite end of the sleeve extending through the elastic ring and being attached to the edge thereof farthest from the channel ring, whereby when either ring is turned on its axis relative to the other the sleeve will be twisted to reduce the diameter of its central portion and draw the rings toward each other, the elastic ring being expandable sufficiently to permit it to be slipped over the other ring and into said channel to hold the rings together.

References Cited by the Examiner
UNITED STATES PATENTS

| | | | |
|---|---|---|---|
| 954,311 | 4/1910 | Leiner | 2—270 |
| 1,431,918 | 10/1922 | Arthur | 128—30 |
| 2,695,605 | 11/1954 | Gibbon | 128—1.02 |
| 2,730,723 | 1/1956 | Jansson | 2—270 |
| 2,761,442 | 9/1956 | Emerson | 128—30 |
| 2,914,773 | 12/1959 | Walter | 2—269 |
| 3,060,444 | 10/1962 | Hoffmaster et al. | 2—8 |

JORDAN FRANKLIN, *Primary Examiner.*

J. R. BOLER, *Assistant Examiner.*